United States Patent
Ahrendt et al.

(10) Patent No.: US 6,622,963 B1
(45) Date of Patent: Sep. 23, 2003

(54) SYSTEM AND METHOD FOR CONTROLLING THE MOVEMENT OF AN AIRCRAFT ENGINE COWL DOOR

(75) Inventors: Terry J. Ahrendt, Mesa, AZ (US); Andrew T. Johnson, Scottsdale, AZ (US); Kevin K. Chakkera, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/123,785

(22) Filed: Apr. 16, 2002

(51) Int. Cl.⁷ ............................................... B64D 27/00
(52) U.S. Cl. ..................... 244/54; 244/53 B; 60/226.2; 248/554
(58) Field of Search ................... 244/54, 53 B, 244/129.4; 60/226.2; 248/554

(56) References Cited

U.S. PATENT DOCUMENTS

| | | | |
|---|---|---|---|
| 1,175,346 A | 3/1916 | Dearborn | |
| 2,912,632 A | 11/1959 | Turtil | |
| 3,514,952 A | 6/1970 | Schumacher et al. | |
| 3,515,361 A | 6/1970 | Blackburn | |
| 3,618,880 A | 11/1971 | Hagaman et al. | |
| 3,621,763 A | 11/1971 | Geyer | |
| 3,714,535 A | 1/1973 | Krivak et al. | |
| 3,795,853 A | 3/1974 | Whitehouse | |
| 3,815,357 A | 6/1974 | Brennan | |
| 3,932,058 A | 1/1976 | Harner et al. | |
| 3,936,226 A | 2/1976 | Harner et al. | |
| 4,005,822 A | 2/1977 | Timms | |
| 4,137,711 A | 2/1979 | Montgomery | |
| 4,184,107 A | 1/1980 | Turnini et al. | |
| 4,191,094 A | 3/1980 | Flippo | |
| 4,284,930 A | 8/1981 | Matty | |
| 4,297,844 A | 11/1981 | Halin et al. | |
| 4,383,647 A | 5/1983 | Woodruff et al. | |
| 4,424,669 A | 1/1984 | Fage | |
| 4,437,783 A | 3/1984 | Halin et al. | |
| 4,442,928 A | 4/1984 | Eastman | |
| 4,458,863 A | 7/1984 | Smith | |
| 4,459,121 A | 7/1984 | Gazzera et al. | |
| 4,462,207 A | 7/1984 | Hitchcock | |
| 4,543,783 A | 10/1985 | Greiine et al. | |
| 4,546,783 A | 10/1985 | Lott | |
| 4,585,189 A | 4/1986 | Buxton | |
| 4,586,329 A | 5/1986 | Carlin | |
| 4,607,202 A | 8/1986 | Koenig | |
| 4,651,621 A | 3/1987 | Eastman | |
| 4,656,407 A | 4/1987 | Burney | |
| 4,788,531 A | 11/1988 | Corwin et al. | |
| 4,827,248 A | 5/1989 | Crudden et al. | |
| 5,167,119 A | 12/1992 | Ward | |
| 5,213,286 A | 5/1993 | Elliott, deceased et al. | |
| 5,243,817 A | 9/1993 | Matthias | |
| 5,267,436 A | 12/1993 | Wood, Jr., et al. | |
| 5,282,719 A | 2/1994 | McCarty et al. | |
| 5,313,788 A | 5/1994 | Wright et al. | |
| 5,327,055 A | 7/1994 | Danielson et al. | |
| 5,350,136 A | * 9/1994 | Prosser et al. ........... 244/118.2 |
| 5,381,654 A | 1/1995 | Halin | |
| 5,448,884 A | 9/1995 | Repp | |
| 5,524,431 A | 6/1996 | Brusson et al. | |

(List continued on next page.)

*Primary Examiner*—J. Woodrow Eldred
(74) *Attorney, Agent, or Firm*—Keith A. Newburry, Esq.

(57) ABSTRACT

An electric control system and method for operating the cowl doors of an aircraft engine that includes one embodiment with one or more electric motors that are energized to move the cowl doors to the open position. The motor is de-energized and the cowl doors are allowed to close under their own weight, driving the motor and causing it to operate as a generator. An electrical load absorbs the energy generated by the motor while the cowl doors close, thereby limiting the speed at which the doors close.

30 Claims, 4 Drawing Sheets

U.S. PATENT DOCUMENTS

| | | |
|---|---|---|
| 5,615,549 A | 4/1997 | Valleroy |
| 5,813,218 A | 9/1998 | Kohlbacher |
| 5,826,823 A | 10/1998 | Lymons et al. |
| 5,904,041 A | 5/1999 | Dhainault |
| 5,960,626 A | 10/1999 | Baudu et al. |
| 5,996,937 A | 12/1999 | Gonidec et al. |
| 6,009,356 A | 12/1999 | Monroe |
| 6,021,636 A | 2/2000 | Johnson et al. |
| 6,034,492 A | 3/2000 | Saito et al. |
| 6,042,053 A | 3/2000 | Sternberger et al. |
| 6,044,641 A | 4/2000 | Baudu et al. |
| 6,094,908 A | 8/2000 | Baudu et al. |
| 6,121,740 A | 9/2000 | Gale et al. |
| 6,167,694 B1 | 1/2001 | Davies |
| 6,178,867 B1 | 1/2001 | Kovac |
| 6,211,665 B1 | 4/2001 | Ahrendt et al. |
| 6,220,546 B1 * | 4/2001 | Klamka et al. .......... 244/129.4 |
| 6,240,246 B1 | 5/2001 | Evans |
| 6,307,339 B1 | 10/2001 | Yourist et al. |

* cited by examiner

SYSTEM AND METHOD FOR CONTROLLING THE MOVEMENT OF AN AIRCRAFT ENGINE COWL DOOR

BACKGROUND OF THE INVENTION

1. Field of the Invention

The present invention relates to a system and method for moving one or more aircraft engine cowl doors and, more particularly, to a system and method for controlling the movement of one or more engine cowl doors using an electric control system.

2. Description of Related Art

The engines installed on many aircraft are housed within a nacelle. Typically, the engine nacelle includes one or more cowl doors. The cowl doors allow maintenance personnel to access the interior of the nacelle to repair and maintain the engine.

The movement of the cowl doors between the open and closed positions has, in the past, been accomplished via hydraulic or pneumatic actuation systems. Hydraulic systems may include one or more hydraulic controllers and hydraulic lines coupled to the aircraft's hydraulic system, and hydraulic actuators connected to the doors. Pneumatic systems may include one or more controllers coupled to one or more pneumatic motors that are coupled to the cowl doors via actuators. These hydraulic and pneumatic control systems are generally satisfactory, but can be complex, bulky, and heavy.

Hence, there is a need for an improved system that can control the movement of the engine cowl doors, that is safe, simple, reliable, less expensive, and light in weight as compared to hydraulic or pneumatic control systems. The present invention addresses one or more of these needs.

SUMMARY OF THE INVENTION

The present invention provides a comparatively simple, reliable, and lightweight system and method for controlling movement of a jet engine cowl door.

In one embodiment of the present invention, and by way of example only, a system for controlling movement of a jet engine cowl door between an open position and a close position includes an electric motor, at least one actuator, an electrically operated brake assembly, and a first switch. The actuator is coupled to the motor and is operable to move the cowl door to the open position. The electrically operated brake assembly is electrically coupled in parallel with the motor and is operable to allow motor rotation when energized and stop motor rotation when de-energized. The first switch is coupled to a power source and has at least a first position and a second position, the first switch is operable to couple the power source to the motor and the brake assembly when in the first position and remove the power source from the motor and couple the power source to the brake assembly when in the second position.

In another exemplary embodiment, an aircraft engine nacelle includes a nacelle housing with at least one cowl door, a gas turbine engine, and a system for moving the cowl door. The nacelle housing cowl door is moveable between an open position and a closed position. The gas turbine engine is mounted in the nacelle. The system for moving the cowl door includes an electric motor, at least one actuator, an electrically operated brake assembly, and a switch. The actuator is coupled to the motor and is operable to move the cowl door to the open position. The electrically operated brake assembly is electrically coupled in parallel with the motor and is operable to allow motor rotation when energized and stop motor rotation when de-energized. The switch is coupled to a power source and has at least a first position and a second position, the switch is operable to couple the power source to the motor and the brake assembly when in the first position and remove the power source from the motor and couple the power source to the brake assembly when in the second position.

In still another exemplary embodiment, a method of controlling movement of the cowl door between closed and opened positions includes releasing a brake assembly to allow rotation of the electric motor, energizing the electric motor to thereby rotate the motor in a first predetermined direction to move the cowl door to the opened position, and de-energizing the motor to allow the cowl door to move to the closed position under gravitational force.

Other independent features and advantages of the preferred cowl door operating system and method will become apparent from the following detailed description, taken in conjunction with the accompanying drawings which illustrate, by way of example, the principles of the invention.

DETAILED DESCRIPTION OF THE PREFERRED EMBODIMENT

Figure 1:
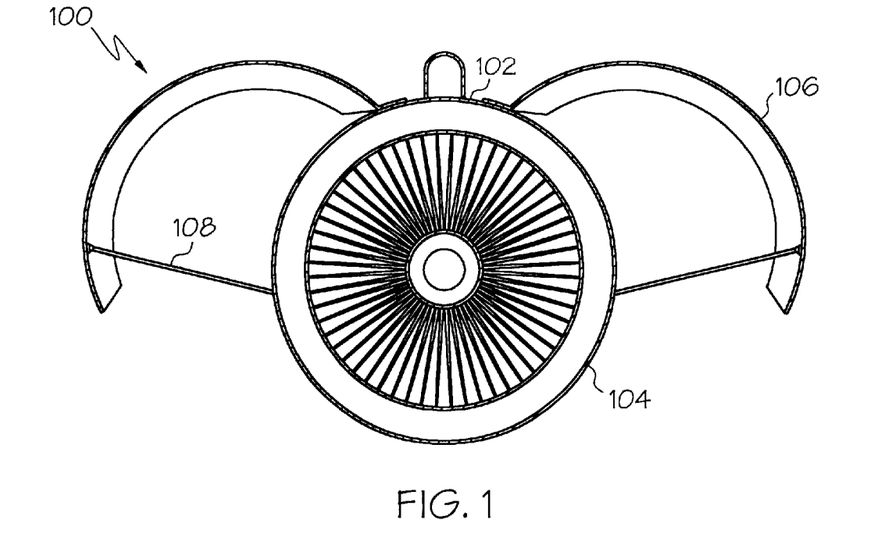
FIG. 1 illustrates a front view of a jet engine with at least one set of cowl doors open.

An engine 100, such as the gas turbine engine depicted in FIG. 1, includes at least a fan section and a turbine section that are housed within an engine nacelle 102. The nacelle 102 includes one or more sets of cowl doors that may be opened to provide access to various portions of the engine. For example, the nacelle 102 may include fan cowl doors 104 (shown in the closed position), one on each side of the engine nacelle 102, that may be opened to provide access to the engine fan section, and engine cowl doors 106 (shown in the opened position), one on each side of the engine nacelle 102, that may be opened to provide access to the turbine engine section. It will be appreciated that the jet engine 100, depending upon its configuration, may include additional cowl doors beyond those explicitly depicted and described. As FIG. 1 additionally depicts, one or more holding tubes 108 may be mounted on the inner portion of the cowl doors 104 and 106 to assist in holding the cowl doors 104 and 106 open.

Figure 2:
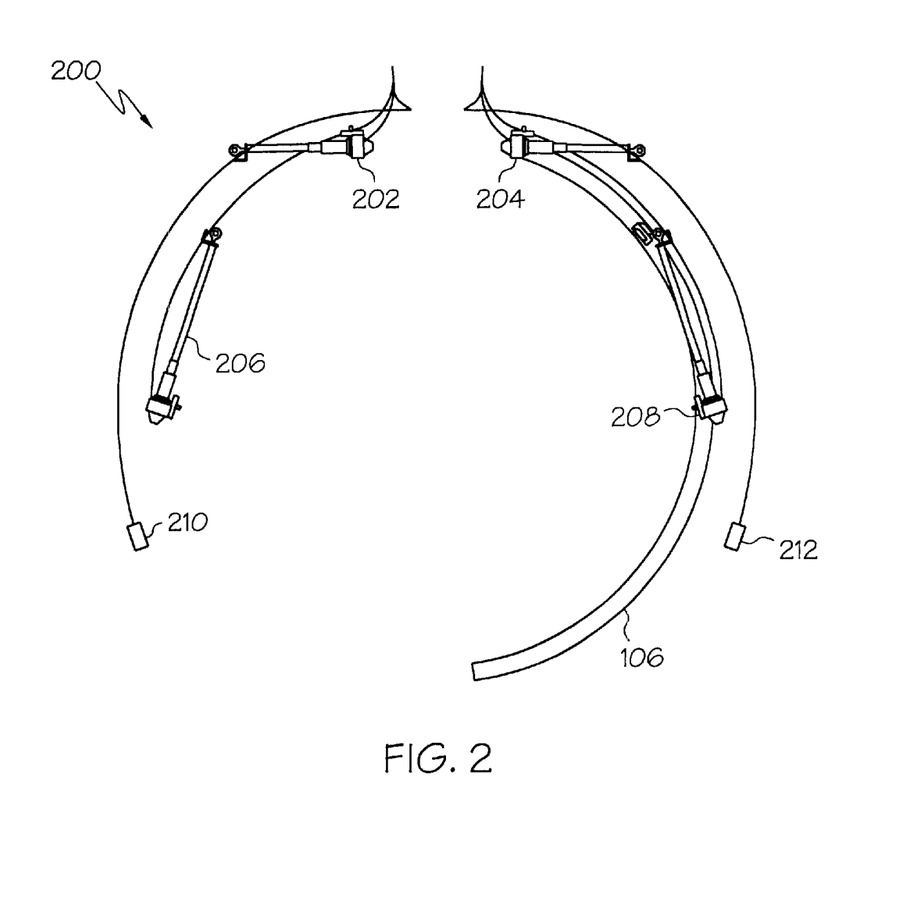
FIG. 2 is a perspective schematic view of an exemplary embodiment of a cowl door control system according to the present invention that depicts one physical arrangement of the actuator assemblies within the engine nacelle.

The cowl doors 104 and 106 are each moved between the open and close positions using a cowl door operating control system 200. An exemplary embodiment of the control system is depicted in FIG. 2, in perspective schematic form. The control system 200 includes a plurality of actuator assemblies and one or more controllers. In the depicted embodiment, the control system 200 includes first and second fan cowl door actuators 202 and 204, and first and second engine cowl door actuators 206 and 208. The first 202 and second 204 fan cowl door actuators are each coupled to one of the fan cowl doors 102 and, likewise, the first 206 and second 208 engine cowl door actuators are each coupled to one of the engine cowl doors 104. For the sake of clarity, only a single engine cowl door 106 is depicted in FIG. 2.

A first controller 210 is electrically coupled to the first fan cowl door actuator 202 and to the first engine cowl door actuator 206, and a second controller 212 is electrically coupled to the second fan cowl door actuator 204 and to the second engine cowl door actuator 208. As will be discussed below, the first 210 and second 212 controllers control the movement of the actuators 202–208, thereby controlling the movement of the cowl doors 104 and 106.

In a preferred embodiment, each controller 212 and 214 is operable to separately control the movement of each of the actuator assemblies to which it is coupled. It will be appreciated, however, that the controllers 212 and 214 could be configured to simultaneously control the movement of each actuator assembly. It will be further appreciated that although the depicted control system 200 includes two controllers 214 and 216, one for the doors on each side of the engine 100, the control system 200 could also be configured with individual controllers for each actuator assembly, or as a single controller that controls the movement of the actuator assemblies individually or collectively.

Figure 3:
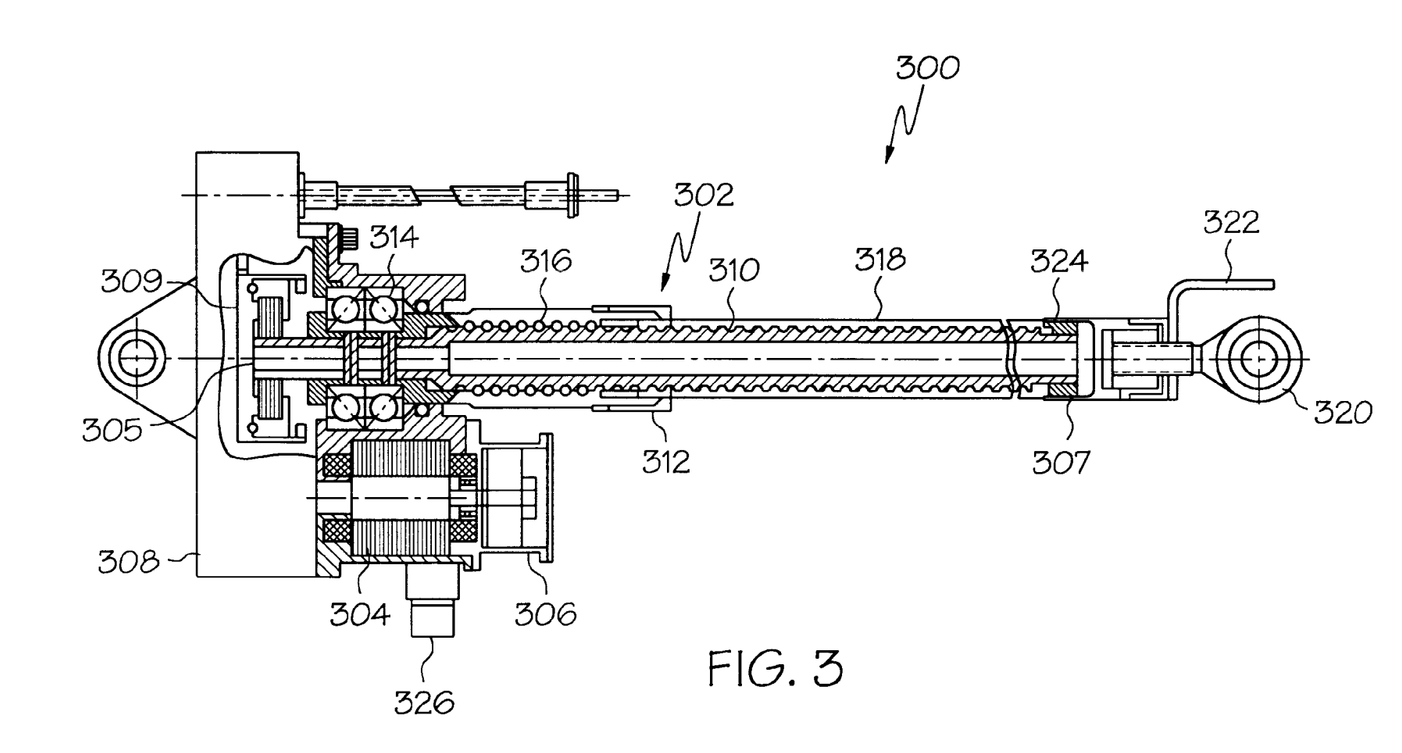
FIG. 3 is a partial cross-section view of an actuator assembly depicted in FIG. 2 that may be used to move the cowl doors depicted in FIG. 1.

Turning now to FIG. 3, an exemplary preferred embodiment of an actuator assembly 300 that may be used as either a fan cowl door actuator 202 and 204 or an engine cowl door actuator 206 and 208 will be described. The actuator assembly 300 includes an actuator 302, an electric motor 304, and an electrically operated brake assembly 306. In the depicted embodiment, the actuator 302 includes a gear box 308, a ball screw shaft 310 and a ball nut 312. The gear box 308 houses reduction gears (not illustrated) and mechanically couples the motor 304 to the ball screw shaft 310. As FIG. 3 further illustrates, the gear box 308 may also house a torque limiter 309 that is mechanically coupled between reduction gears and the ball screw shaft 310. The torque limiter 309 is preferably a ball ramp type torque limiting clutch that limits the output force below the actuator load limit should a jam occur at any position along the stroke of the actuator assembly 300. The torque limiter 309 also inhibits potential damage during manual operation of the actuator assembly 300. The ball screw shaft 310 is rotationally mounted by a duplex bearing assembly 312 positioned proximate a first end 305 of the ball screw shaft 310. The ball nut 312 is rotationally supported on the ball screw shaft 310 by a plurality of ball bearings 316 and is coupled, via an extension tube 318 and spherical bearing 320, to one of the cowl doors (not illustrated in FIG. 3). An anti-rotation tang 322 prevents the ball nut 312 and extension tube 318 from rotating. Thus, rotation of the motor 304 causes rotation of the ball screw shaft 310, which results in translation of the ball nut 312 and movement of the attached cowl door. A mechanical hard stop 324 is coupled to a second end 307 of the ball screw shaft 310 and stops translation of the ball nut 312, and thus the cowl door, in the open direction. An electrical connector 326 provides the electrical interface to the cowl door operating controllers 210 and 212. It is to be appreciated that although the actuators 300 depicted and described herein are ballscrew type actuators, the depicted embodiment could use other types of actuator designs such as, for example, jack screw actuators and roller screw actuators.

The motor 304 is coupled to the actuator 302 via the reduction gears. The motor 304 is preferably a brush DC motor, though various DC motor designs may be used. Because the motor 304 is a DC motor, the polarity of the DC voltage applied to it determines its direction of rotation. Thus, as will be described below, the motor 304 is electrically connected so that when it is energized, it rotates in a direction that will cause the actuator 302 to move the cowl door to which it is coupled to the open position.

The DC motor 304 may also operate as a generator. Specifically, if a DC motor is rotated by an external power source, it will generate a DC output voltage. The magnitude of the generated DC voltage is directly proportional to the rotational speed. Thus, as a generating DC motor's rotational speed increases, the magnitude of the generated DC voltage also increases. Connecting an electrical load across the generating DC motor's output will load the generating motor, applying a torque resisting the DC motor's rotation, acting as a brake. The generating characteristic of the motor 304, as is discussed further below, is used by the cowl door operating control system 200.

The brake assembly 306 is preferably coupled to the motor 304 and may be any one of numerous known brake designs known in the art such as, for example, an electromagnetic brake assembly. No matter the particular design, the brake assembly 306 is preferably operable to apply a braking force to the motor 304 when power is removed from the brake assembly 306, and to remove the braking force from the motor 304 when power is supplied to the brake assembly 306. Thus, when the brake assembly 306 is de-energized, it substantially prevents rotation of the motor 304, and when the brake assembly 306 is energized, it allows the motor 304 to rotate freely.

Figure 4:
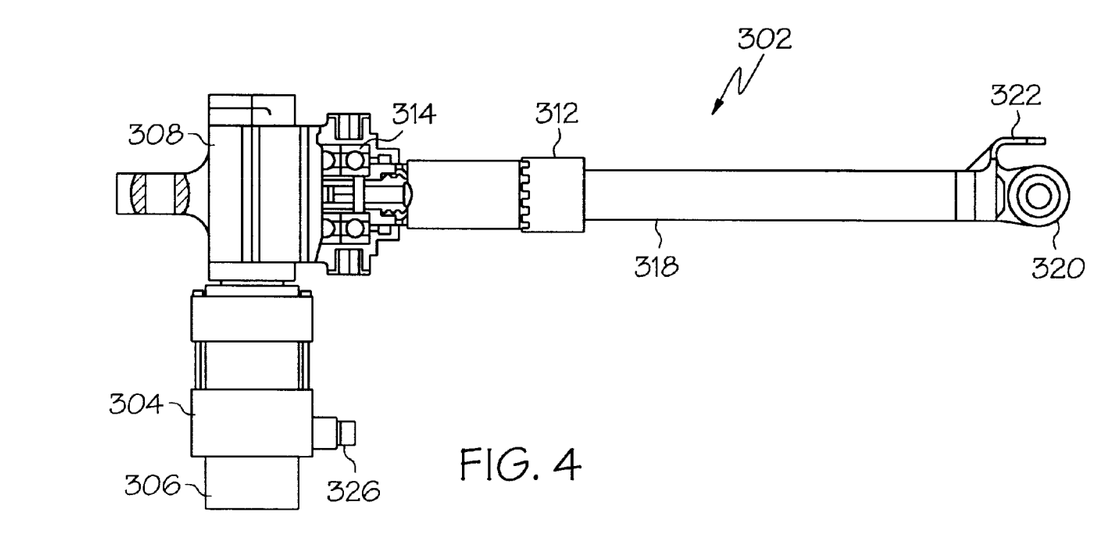
FIGS. 4 and 5 are alternate configurations of the actuator assembly depicted in FIG. 3.
Figure 5:
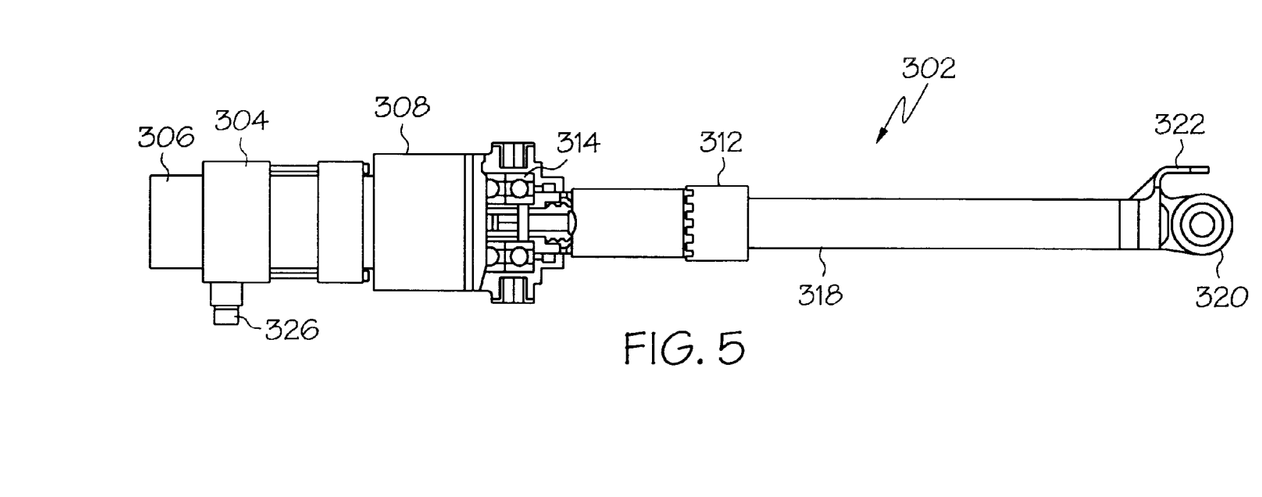

The actuator assembly 300 may be configured so that the motor 304 and brake assembly 306 are offset from, but in the same plane as, the actuator 302, as depicted in FIG. 3, or the actuator assembly 300 may be configured as depicted in FIGS. 4 and 5, in which the motor 304 and brake assembly 306 are in line with the actuator 302 and perpendicular with the actuator, respectively. It will additionally be appreciated that in each of the described embodiments the motor 304 could be directly coupled to the actuator 302 without any intervening gears.

Figure 6:
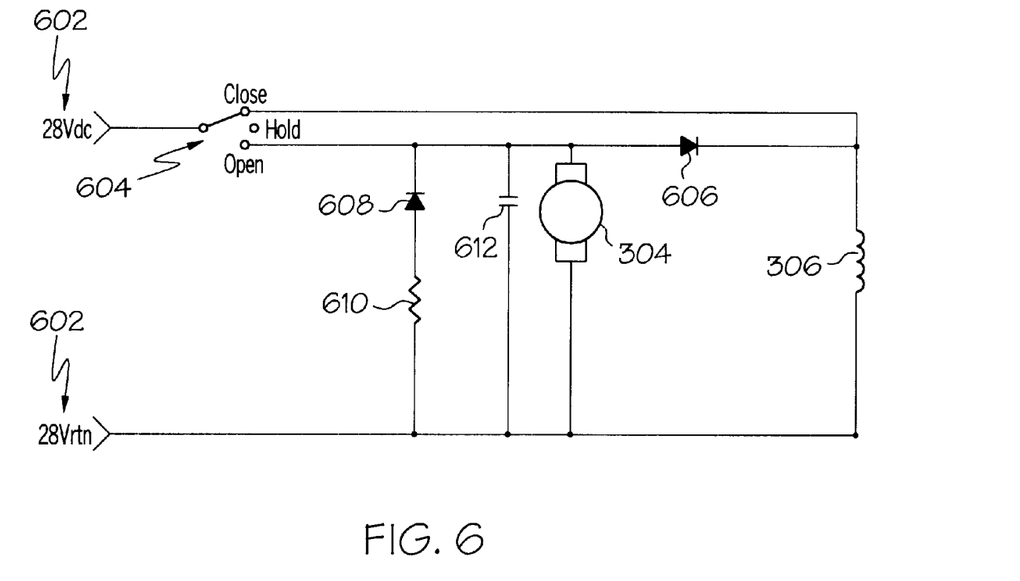
FIG. 6 is a schematic diagram of a controller circuit used to control the actuator assemblies depicted in FIGS. 3–5.

With reference now to FIG. 6, a detailed description of the cowl door operating controllers 210 and 212 will be provided. The cowl door operating controllers 210 and 212 are each electrically coupled to a receive power from a power source 602. This power source 602 may be the electrical system of the aircraft or by a ground power source, such as a ground cart. In a preferred embodiment, the power source 602 is a 28 volt direct current (VDC) power source, though it will be appreciated that DC power sources of other magnitudes, either higher or lower, may also be used. It will additionally be appreciated that the DC power may be derived from a rectified AC power source. Each controller 210 and 212 is electrically coupled to one of the motors 304 and one of the brake assemblies 306, and includes a cowl position control switch 604 and various other circuit elements that are discussed in more detail below.

The cowl position control switch 604 is a multi-position switch, preferably having at least three positions such as, for example, OPEN, HOLD, and CLOSE positions. In the OPEN position, the position control switch 604 electrically couples both the motor 304 and the brake assembly 306 to the power source 602. This causes the brake assembly 306 to release, and the motor 304 to rotate in the direction to open the cowl doors 104 and 106. The motor 304 will continue to rotate in the open direction until the position control switch 604 is moved to the HOLD position, the CLOSE position, or until the cowl door 102, 104 reaches its full open position.

In the HOLD position, the position control switch 604 disconnects the power source 602 from both the motor 304 and the brake assembly 306. This causes the motor 304 to stop rotating in the open direction (if it was rotating in that direction) and the brake assembly 306 to engage. As a result, the cowl doors 104 and 106 are held in place by the brake assembly 306. For additional holding power, the holding tubes 108 may be extended into position, as indicated in FIG. 1 above. It will be appreciated that other mechanisms may also be used to hold the cowl doors in the open position.

In the CLOSE position, the brake assembly 306 is electrically coupled to the power source 602. However, a first diode 606 is electrically coupled in the circuitry such that it is reverse biased when the cowl position control switch 604 is in the CLOSE position, thereby removing power from the motor 304. Thus, in the CLOSE position the motor 304 is de-energized and the brake assembly 306 is released. As a result, the cowl doors 104 and 106 will move toward the close position under the force of their own weight, and drive the motor 304 in a rotational direction that is opposite the normal opening direction.

As noted above, when the motor 304 is driven in this manner, it operates as a generator and generates a DC voltage. The polarity of the DC voltage generated by the motor 304 forward biases a second diode 608, allowing current to flow through a load resistor 610. The current flow through the load resistor 610 will generate a resisting torque on the generating motor 304 that will limit the closing speed of the cowl doors 104 and 106.

As FIG. 6 additionally depicts, the each controller 210 and 212 may additionally include a capacitive circuit element 612. This capacitive circuit element 612 may be made up of one or more capacitors, and is included to reduce any electromagnetic interference (EMI) emissions generated by the motor 304.

Figure 7:
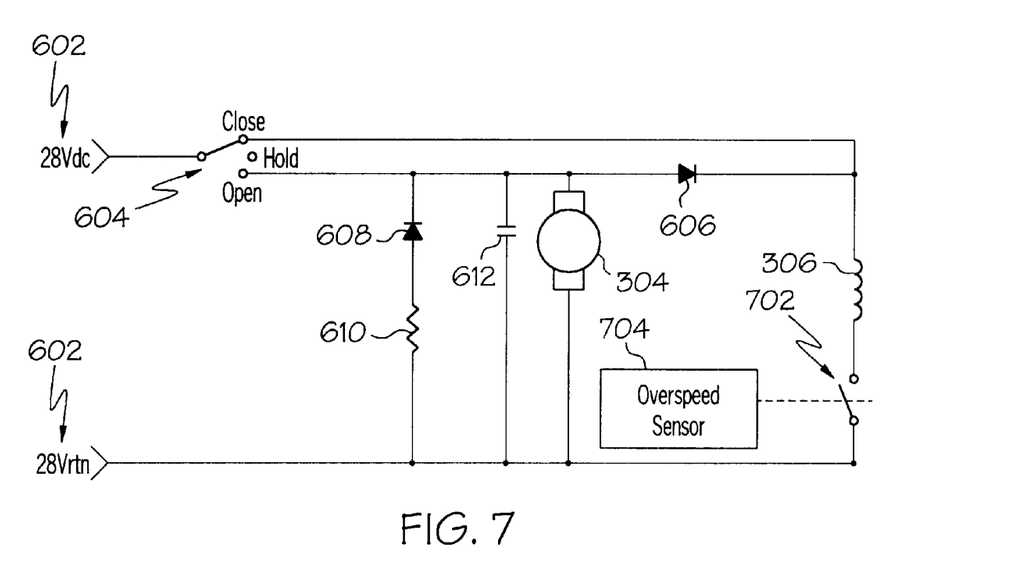
FIG. 7 is a schematic diagram of an alternative embodiment of the controller circuit depicted in FIG. 6.

In an alternate embodiment, which is depicted in FIG. 7, the controllers 210 and 212 each include an overspeed switch 702. The overspeed switch 702 is electrically coupled in series with the brake assembly 306 and is operable to selectively de-energize the brake assembly 306 when the rotational speed of the motor 304 is at or above a predetermined rotational speed magnitude. The overspeed switch 702 may be a centrifugal switch that opens when the motor's rotational speed is at or above the predetermined rotational speed magnitude. Alternately, as further depicted in FIG. 7, the controller 210 and 212 may include a motor speed sensor 704 that senses the motor's rotational speed and opens the overspeed switch 702 when the motor's rotational speed is at or above the predetermined rotational speed magnitude. The motor speed sensor 704 may be any one of numerous speed sensors known in the art, but in a preferred embodiment the motor speed sensor 704 determines the motor's rotational speed by sensing the voltage magnitude across the motor 304. When the voltage magnitude across the motor 304 exceeds a predetermined voltage magnitude, the sensor 704 opens the overspeed switch 702 and de-energizes the brake assembly 306.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A system for controlling movement of an aircraft engine cowl door between an open position and a closed position, comprising:

an electric motor;

at least one actuator coupled to the motor and operable to move the cowl door to the open position;

an electrically operated brake assembly electrically coupled in parallel with the motor, the brake assembly operable to allow motor rotation when energized and stop motor rotation when de-energized; and a first switch coupled to a power source and having at least a first position and a second position, the first switch operable to couple the power source to the motor and the brake assembly when in the first position and remove the power source from the motor and couple the power source to the brake assembly when in the second position.

2. The system of claim 1, wherein:

the first switch has a third position; and the first switch is operable to remove power from the motor and from the brake assembly when in the third position.

3. The system of claim 1, further comprising a motor speed sensor operable to sense a rotational speed of the motor and to selectively energize and de-energize the brake assembly when the motor rotational speed is, respectively, at or above a first predetermined rotational speed and at or below a second predetermined rotational speed.

4. The system of claim 1, further comprising:

a second switch electrically coupled in series with the brake assembly, the second switch having at least a close position and an open position and operable to move to the open position when the motor rotational speed is at or above a first predetermined rotational speed and move to the close position when the motor rotational speed is at or below a second predetermined rotational speed.

5. The system of claim 4, further comprising:

a motor speed sensor operable to sense a rotational speed of the motor and operable to move the second switch to the open position when the motor rotational speed is at or above a first predetermined rotational speed and move the second switch to the close position when the motor rotational speed is at or below a second predetermined rotational speed.

6. The system of claim 1, further comprising:

a load impedance electrically coupled in parallel with the motor.

7. The system of claim 6, further comprising:

a first rectifying circuit element electrically coupled in series between the motor and the load impedance.

8. The system of claim 1, further comprising:

an electromagnetic interference suppressing circuit element electrically coupled in parallel with the motor.

9. The system of claim 1, further comprising:
a second rectifying circuit element electrically coupled in series between the motor and the brake assembly.

10. The system of claim 1, further comprising:
a controller, the controller housing at least the first switch therein.

11. A system for controlling movement of an aircraft engine cowl door between an open position and a closed position, comprising:
an electric motor;
at least one actuator coupled to the motor and operable to move the cowl door to the open position;
an electrically operated brake assembly electrically coupled in parallel with the motor, the brake assembly operable to allow motor rotation when energized and stop motor rotation when de-energized; and
a first switch coupled to a power source and having at least a first position, a second position, and a third position, the first switch operable to couple the power source to the motor and the brake assembly when in the first position, remove the power source from the motor and the brake assembly when in the second position, and remove the power source from the motor and couple the power source to the brake assembly when in the second position.

12. The system of claim 11, further comprising a motor speed sensor operable to sense a rotational speed of the motor and to selectively energize and de-energize the brake assembly when the motor rotational speed is, respectively, at or above a first predetermined rotational speed and at or below a second predetermined rotational speed.

13. The system of claim 11, further comprising:
a second switch electrically coupled in series with the brake assembly, the second switch having at least a close position and an open position and operable to move to the open position when the motor rotational speed is at or above a first predetermined rotational speed and move to the close position when the motor rotational speed is at or below a second predetermined rotational speed.

14. The system of claim 13, further comprising:
a motor speed sensor operable to sense a rotational speed of the motor and operable to move the second switch to the open position when the motor rotational speed is at or above a first predetermined rotational speed and move the second switch to the close position when the motor rotational speed is at or below a second predetermined rotational speed.

15. The system of claim 11, further comprising:
a load impedance electrically coupled in parallel with the motor.

16. The system of claim 15, further comprising:
a first rectifying circuit element electrically coupled in series between the motor and the load impedance.

17. The system of claim 11, further comprising:
an electromagnetic interference suppressing circuit element electrically coupled in parallel with the motor.

18. The system of claim 11, further comprising:
a second rectifying circuit element electrically coupled in series between the motor and the brake assembly.

19. The system of claim 11, further comprising:
a controller, the controller housing at least the first switch therein.

20. A system for controlling movement of an aircraft engine cowl door between an open position and a closed position, comprising:
an electric motor;
at least one actuator coupled to the motor and cowl door and operable to move the cowl door to the open position;
an electrically operated brake assembly electrically coupled in parallel with the motor, the brake assembly operable to allow motor rotation when energized and stop motor rotation when de-energized;
a first switch coupled to a power source and having at least a first position, a second position, and a third position, the first switch operable to couple the power source to the motor and the brake assembly when in the first position, remove the power source from the motor and the brake assembly when in the second position, and remove the power source from the motor and couple the power source to the brake assembly when in the second position; and
a second switch electrically coupled in series with the brake assembly, the second switch having at least a close position and an open position and operable to move to the open position when the motor rotational speed is at or above a first predetermined rotational speed and move to the closed position when the motor rotational speed is at or below a second predetermined rotational speed.

21. The system of claim 20, further comprising:
a motor speed sensor operable to sense a rotational speed of the motor and operable to move the second switch to the open position when the motor rotational speed is at or above a first predetermined rotational speed and move the second switch to the close position when the motor rotational speed is at or below a second predetermined rotational speed.

22. The system of claim 20, further comprising:
a controller, the controller housing at least the first and second switches therein.

23. An aircraft engine nacelle, comprising:
a nacelle housing with at least one cowl door moveable between an open position and a closed position;
a gas turbine engine mounted in the nacelle; and
a system for moving the cowl door, including:
an electric motor,
at least one actuator coupled to the motor and operable to move the cowl door to the open position,
an electrically operated brake assembly electrically coupled in parallel with the motor, the brake assembly operable to allow motor rotation when energized and stop motor rotation when de-energized, and
a switch coupled to a power source and having at least a first position and a second position, the switch operable to couple the power source to the motor and the brake assembly when in the first position and remove the power source from the motor and couple the power source to the brake assembly when in the second position.

24. In a jet engine cowl door operating system including an electric motor operatively coupled to the cowl door, a method of controlling movement of the cowl door between closed and opened positions, comprising:
releasing a brake assembly to allow rotation of the electric motor;
energizing the electric motor to thereby rotate the motor in a first predetermined direction to move the cowl door to the opened position; and de-energizing the motor to allow the cowl door to move to the closed position under gravitational force.

25. The method of claim 24, further comprising:

de-energizing the motor; and actuating the brake assembly to prevent rotation of the motor, whereby the cowl door is held in position.

26. The method of claim 25, wherein:

the brake assembly is electrically operated;

the brake assembly is released by supplying electrical power thereto; and the brake assembly is actuated by removing electrical power therefrom.

27. The method of claim 24, wherein the cowl door rotates the motor in a second predetermined direction during cowl door movement toward the closed position, whereby the motor generates a voltage.

28. The method of claim 27, further comprising:

applying the voltage generated by the motor across a load impedance to limit the rotational speed of the motor.

29. The method of claim 24, further comprising:

limiting a rotational speed of the motor.

30. The method of claim 29, wherein limiting the motor rotational speed comprises:

determining the motor rotational speed;

actuating the brake assembly when the determined rotational speed is at or above a first predetermined rotational speed; and releasing the brake assembly when the determined rotational speed is at or below a second predetermined rotational speed.

* * * * *